US010882540B2

(12) United States Patent
Stadie et al.

(10) Patent No.: US 10,882,540 B2
(45) Date of Patent: Jan. 5, 2021

(54) ROBOTIC SERVICE DEVICE AND HANDLING METHOD

(71) Applicant: OCADO INNOVATION LIMITED, Hatfield (GB)

(72) Inventors: Robert Stadie, Hatfield (GB); Andrew John Ingram-Tedd, Hatfield (GB); Matthew Whelan, Hatfield (GB)

(73) Assignee: OCADO INNOVATION LIMITED, Hatfield (GB)

(*) Notice: Subject to any disclaimer, the term of this patent is extended or adjusted under 35 U.S.C. 154(b) by 127 days.

(21) Appl. No.: 16/080,553

(22) PCT Filed: Feb. 28, 2017

(86) PCT No.: PCT/EP2017/054633
§ 371 (c)(1),
(2) Date: Aug. 28, 2018

(87) PCT Pub. No.: WO2017/148939
PCT Pub. Date: Sep. 8, 2017

(65) Prior Publication Data
US 2019/0054932 A1 Feb. 21, 2019

(30) Foreign Application Priority Data

Feb. 29, 2016 (GB) .................................. 1603520.6

(51) Int. Cl.
*B61D 15/00* (2006.01)
*B60L 53/00* (2019.01)
(Continued)

(52) U.S. Cl.
CPC .............. *B61D 15/00* (2013.01); *B08B 1/002* (2013.01); *B08B 3/02* (2013.01); *B08B 5/04* (2013.01);
(Continued)

(58) Field of Classification Search
CPC ..... B25J 5/00; B25J 5/007; B25J 5/02; B65G 1/0464; B65G 1/0492; B65G 1/0478;
(Continued)

(56) References Cited

U.S. PATENT DOCUMENTS 3,851,593 A * 12/1974 Gagnon ............... B65G 1/0414
104/88.01
4,505,630 A * 3/1985 Kaschner ............. B65G 49/085
104/33
(Continued)

FOREIGN PATENT DOCUMENTS

GB 2525309 A 10/2015
JP 2012-043072 A 3/2012
(Continued)

OTHER PUBLICATIONS

Farshad Arvin, et al., "Swarm Robots Long Term Autonomy Using Moveable Charger", 2009 International Conference on Future Computer and Communication, IEEE, Apr. 3, 2009, pp. 127-130.
(Continued)

*Primary Examiner* — Jason C Smith
(74) *Attorney, Agent, or Firm* — Buchanan Ingersoll & Rooney PC

(57) ABSTRACT

A robotic service device for a robotic picking system grid. The robotic service device can be configured for driving to any location on the grid in order to restart malfunctioning robotic load handling devices or to perform maintenance operations or cleaning in situ. Additionally, the service device may be used to rescue robotic load handling devices operational in the picking system. The robotic service device can include a releasable docking mechanism to enable it to dock and latch on to malfunctioning load handling devices. The service device can also be provided with a cleaning (Continued)

device and camera device to enable a condition of a grid and other robotic devices to be monitored.

21 Claims, 9 Drawing Sheets

(51) Int. Cl.
| | |
|---|---|
| B25J 5/00 | (2006.01) |
| B65G 1/04 | (2006.01) |
| B08B 1/00 | (2006.01) |
| B08B 5/04 | (2006.01) |
| B08B 3/02 | (2006.01) |
| B61B 5/02 | (2006.01) |
| B61F 5/50 | (2006.01) |
| B61L 23/04 | (2006.01) |
| B65G 45/18 | (2006.01) |
| B65G 45/22 | (2006.01) |
| B65G 45/24 | (2006.01) |
| B66F 9/06 | (2006.01) |

(52) U.S. Cl.
CPC ............... *B25J 5/007* (2013.01); *B60L 53/00* (2019.02); *B61B 5/02* (2013.01); *B61F 5/50* (2013.01); *B61L 23/04* (2013.01); *B65G 1/0464* (2013.01); *B65G 45/18* (2013.01); *B65G 45/22* (2013.01); *B65G 45/24* (2013.01); *B66F 9/06* (2013.01); *B60L 2200/26* (2013.01)

(58) Field of Classification Search
CPC ......... B61D 15/00; B60L 53/00; B08B 1/002; B08B 3/02; B61B 5/02
See application file for complete search history.

(56) References Cited

U.S. PATENT DOCUMENTS

| | | | | |
|---|---|---|---|---|
| 6,149,366 | A * | 11/2000 | Deandrea | B65G 1/0414 414/279 |
| 10,399,774 | B2 * | 9/2019 | Ramankutty | B65G 1/0421 |
| 2012/0152877 | A1 * | 6/2012 | Tadayon | B25J 5/00 212/224 |
| 2013/0140801 | A1 * | 6/2013 | Schlee | B60B 39/00 280/762 |
| 2015/0127143 | A1 * | 5/2015 | Lindbo | B65G 1/0464 700/218 |
| 2015/0148955 | A1 * | 5/2015 | Chin | B25J 9/162 700/253 |
| 2016/0347545 | A1 * | 12/2016 | Lindbo | B65G 61/00 |
| 2017/0129703 | A1 * | 5/2017 | Lindbo | B65G 1/0492 |
| 2018/0162639 | A1 * | 6/2018 | Ingram-Tedd | B65G 1/0464 |
| 2019/0054932 | A1 * | 2/2019 | Stadie | B65G 1/0464 |
| 2019/0092568 | A1 * | 3/2019 | Ingram-Tedd | B65G 1/065 |
| 2019/0161273 | A1 * | 5/2019 | Ingram-Tedd | B65G 1/0464 |
| 2019/0225436 | A1 * | 7/2019 | Lindbo | B65G 67/46 |
| 2020/0148471 | A1 * | 5/2020 | Lindbo | B65G 1/0464 |

FOREIGN PATENT DOCUMENTS

| | | | |
|---|---|---|---|
| WO | 2013/075078 A1 | 5/2013 | |
| WO | 2015/019055 A1 | 2/2015 | |
| WO | 2015/140216 A1 | 9/2015 | |
| WO | WO-2015140216 A1 * | 9/2015 | ............ B65G 45/22 |
| WO | 2015/185628 A2 | 12/2015 | |

OTHER PUBLICATIONS

Trung Dung Ngo, et al., "Randomized Robot Trophallaxis: From Concept to Implementation", IEEE International Conference on Systems, Man and Cybernetics, Oct. 1, 2007, pp. 208-213.

British Search Report of British Patent Application No. 1703213.7, dated Jul. 14, 2017.

International Search Report (PCT/ISA/210) dated Jun. 9, 2017, by the European Patent Office as the International Searching Authority for International Application No. PCT/EP2017/054633.

Written Opinion (PCT/ISA/237) dated Jun. 9, 2017, by the European Patent Office as the International Searching Authority for International Application No. PCT/EP2017/054633.

* cited by examiner

ROBOTIC SERVICE DEVICE AND HANDLING METHOD

The present invention relates to a robotic picking system device and method. More specifically but not exclusively, it relates to a rescue robotic service device for use in a robotic picking system and a method of improving the reliability of such systems.

Some commercial and industrial activities require systems that enable the storage and retrieval of a large number of different products. One known type of system for the storage and retrieval of items in multiple product lines involves arranging storage bins or containers in stacks on top of one another, the stacks being arranged in rows. The storage bins or containers are accessed from above, removing the need for aisles between the rows and allowing more containers to be stored in a given space.

Methods of handling containers stacked in rows are well known in the art. PCT Publication No WO2015/185628A (Ocado) describes a storage and fulfillment system in which stacks of containers are arranged within a frame structure. The containers are accessed by load handling devices operative on tracks located on the top of the frame structure. The load handling devices lift containers out from the stacks, multiple load handling devices co-operating to access containers located in the lowest positions of the stack. One form of robotic load handling device is described in PCT Patent Publication No WO2015/019055 (Ocado) where each robotic load handler only covers one grid space of the frame work structure, thus allowing higher density of load handlers and thus higher throughput of a given size system.

In some implementations of such bin handling systems, there can be a very large number of robotic load handling devices running on a single grid. These load handling devices can experience problems from time to time and require repair or other intervention in order to return to useful service. PCT Publication No WO2015/140216 (Ocado), herein incorporated by reference details a service device for removing malfunctioning devices from the grid.

It is a disadvantage of the prior art systems described above that in order to rescue a faulty load handling device it must be collected and removed from the grid by an additional robotic rescue device. Such robotic devices may be larger than load handling devices operative on the grid and as such may occupy multiple grid spaces and routes that normally active load handling devices may require to continue to fulfil orders. In the event that a malfunctioning robotic load handling device can be pulled or pushed off the storage system by a robotic service device occupying only a single space, the combination of the two devices will still occupy excessive grid spaces and routes.

According to the invention there is provided a service device for operation on a robotic picking system comprising two substantially perpendicular sets of rails forming a grid and having a plurality of robotic load handling devices thereon, the service device comprising a body mounted on two sets of wheels, the first set of wheels being arranged to engage with at least two rails of the first set of rails, the second set of wheels being arranged to engage with at least two rails of the second set of rails, the first set of wheels being independently moveable and driveable with respect to the second set of wheels such that only one set of wheels is engaged with the grid at any one time thereby enabling movement of the service device along the rails to any point on the grid by driving only the set of wheels engaged with the rails, the service device being further provided with: releasable electrical connecting means which connect the service device to the robotic load handling device; and a power source which supplies power to the robotic load handling device via the electrical connecting means.

In another aspect the invention relates to a method of using of the service device comprising;
i) connecting the service device to the load handling device;
ii) supplying power to the load handling device to restart the load handling device;
iii) disconnecting the service device.

Preferred features of the invention are defined in the claims.

In this way, the present invention overcomes the problems of the prior art and provides a system and method of increasing the reliability and reducing the overall cost of large bin handling systems by the deployment of one or more automated service robots capable of jump starting load handling devices such that they can be removed from the grid under their own power.

Figure 3A:
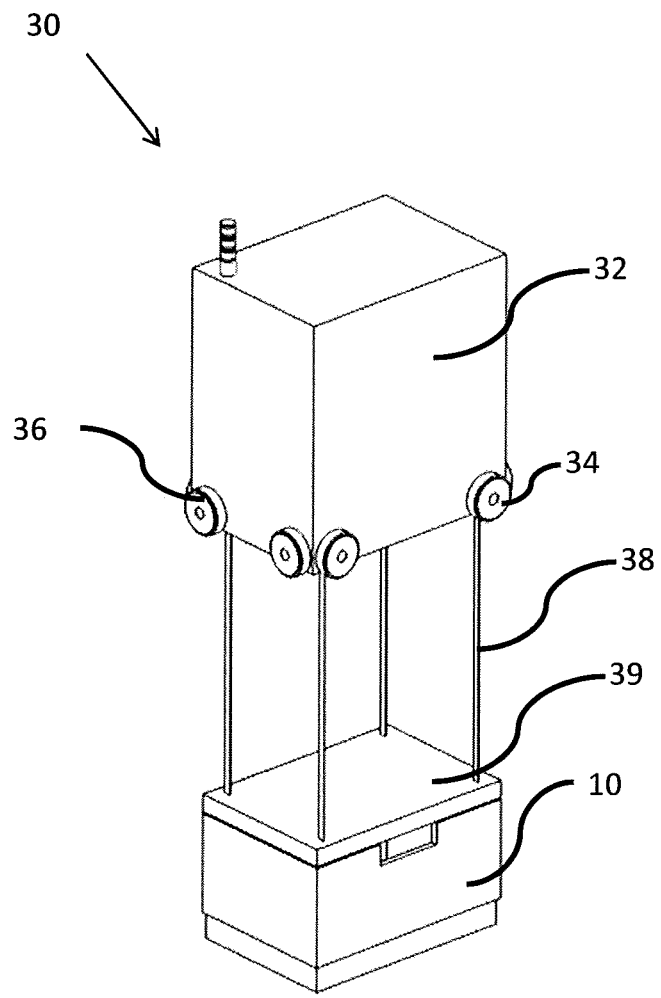
FIGS. 3A and 3B are schematic perspective views, from the rear and front respectively, of one form of robotic load handling device for use with the frame structure of FIGS. 1 and 2.
Figure 4:
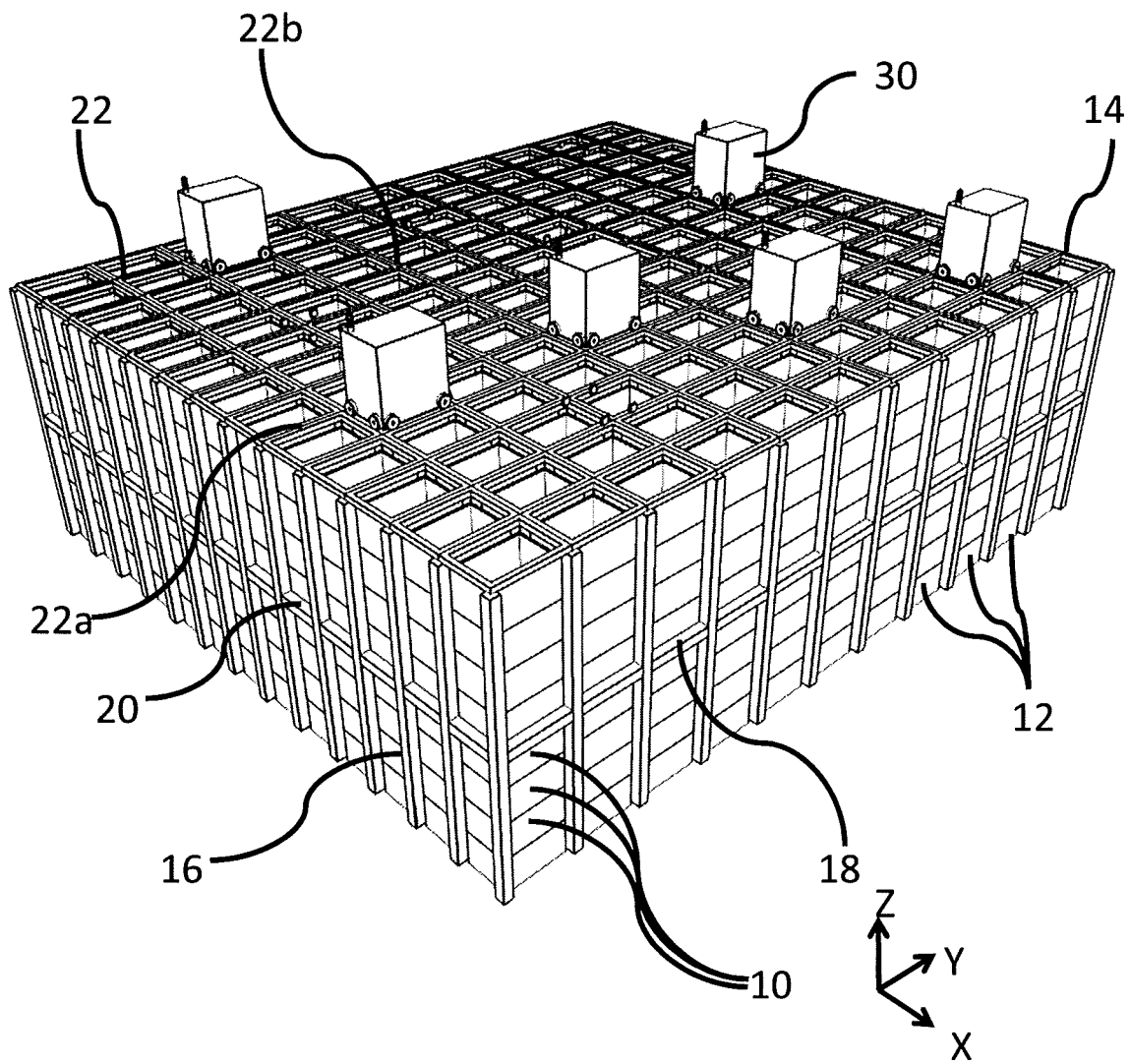
FIG. 4 is a schematic perspective view of a known storage system comprising a plurality of load handler devices of the type shown in FIGS. 3A, 3B and 3C, installed on the frame structure of FIGS. 1 and 2, together with a robotic service device in accordance with one form of the invention.
Figure 5A:
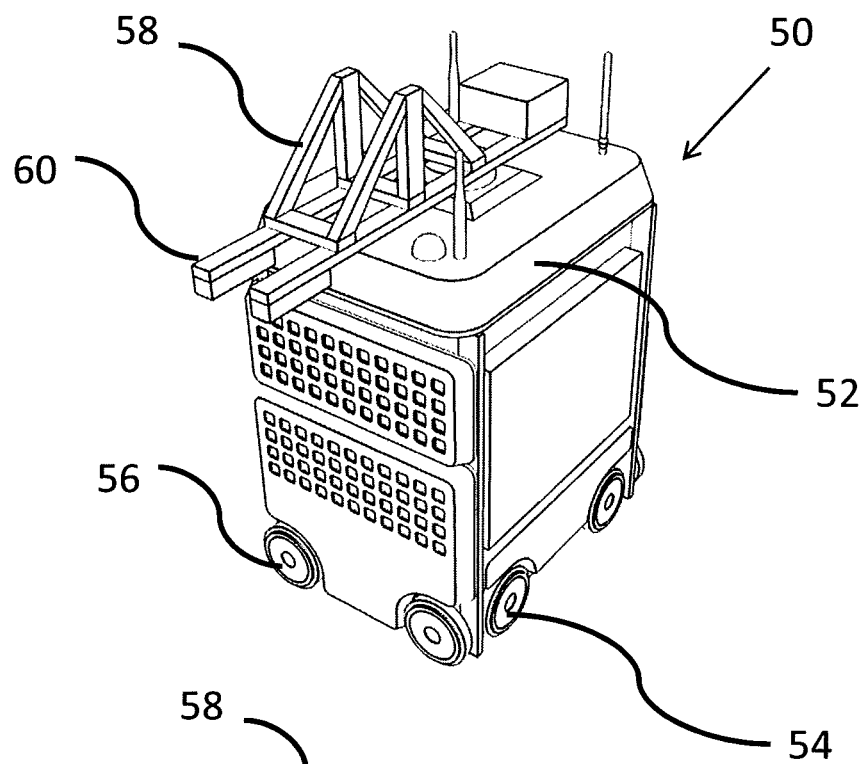
Figure 5B:
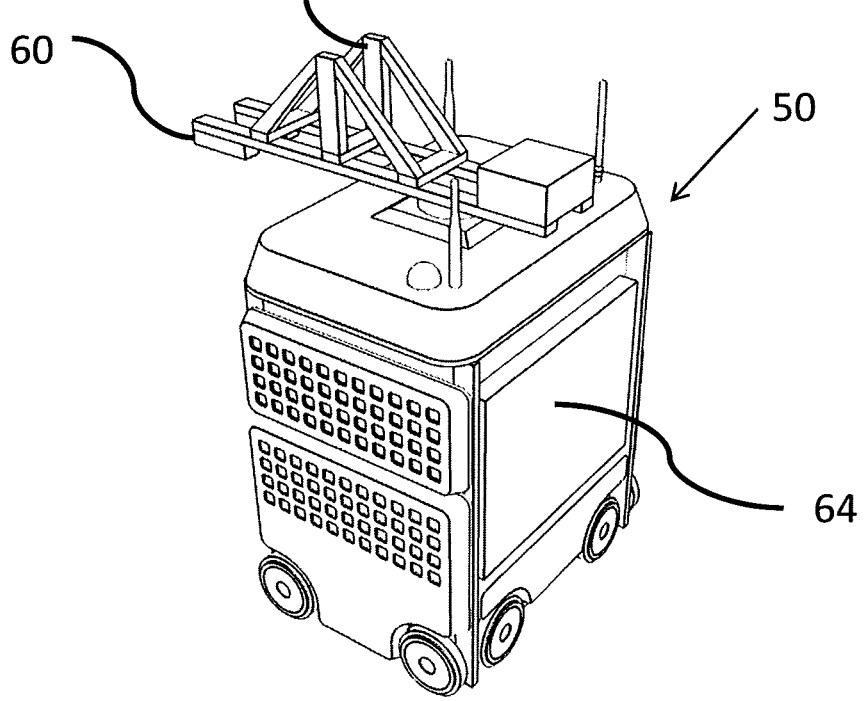
Figure 5C:
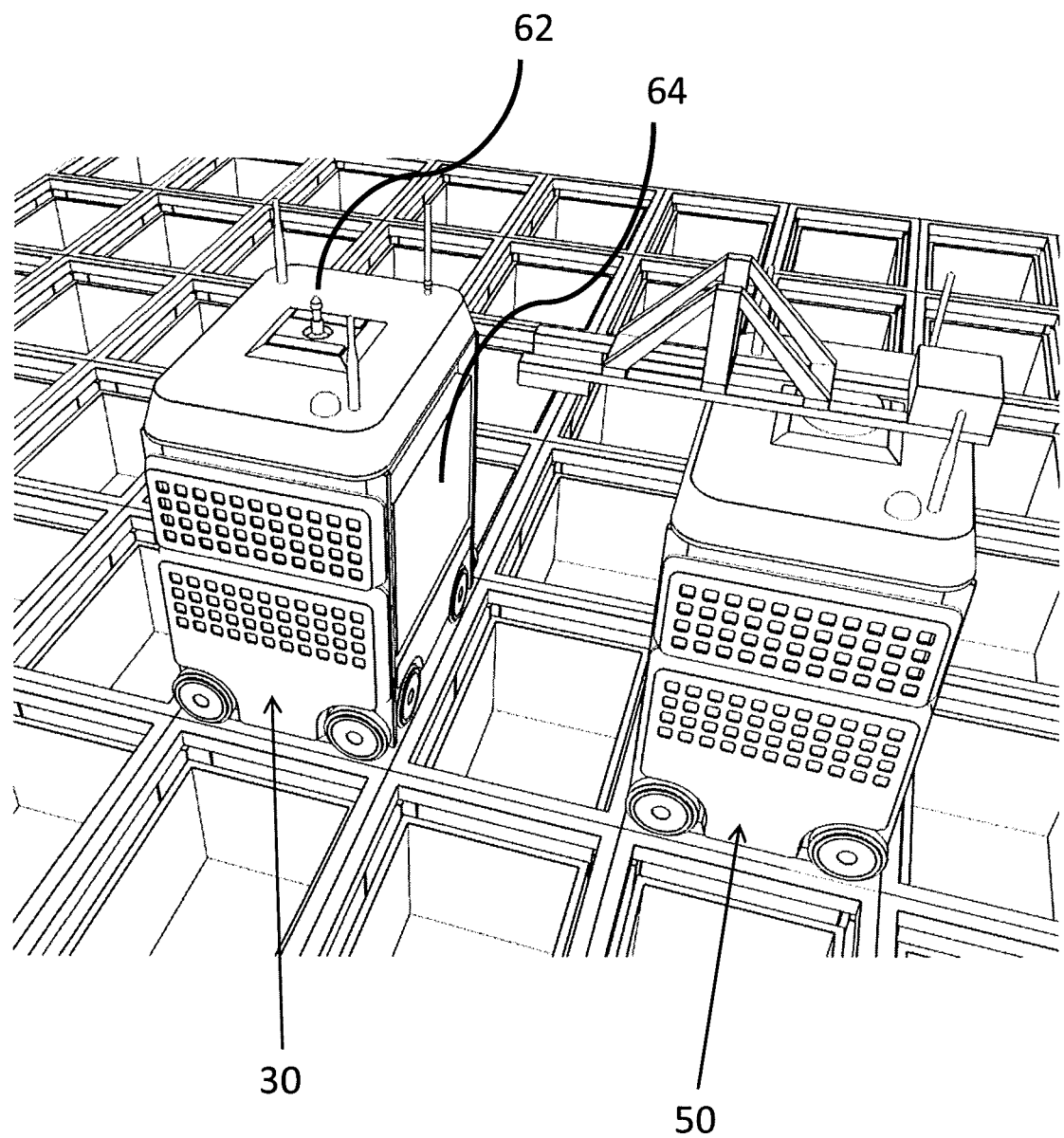
Figure 5D:
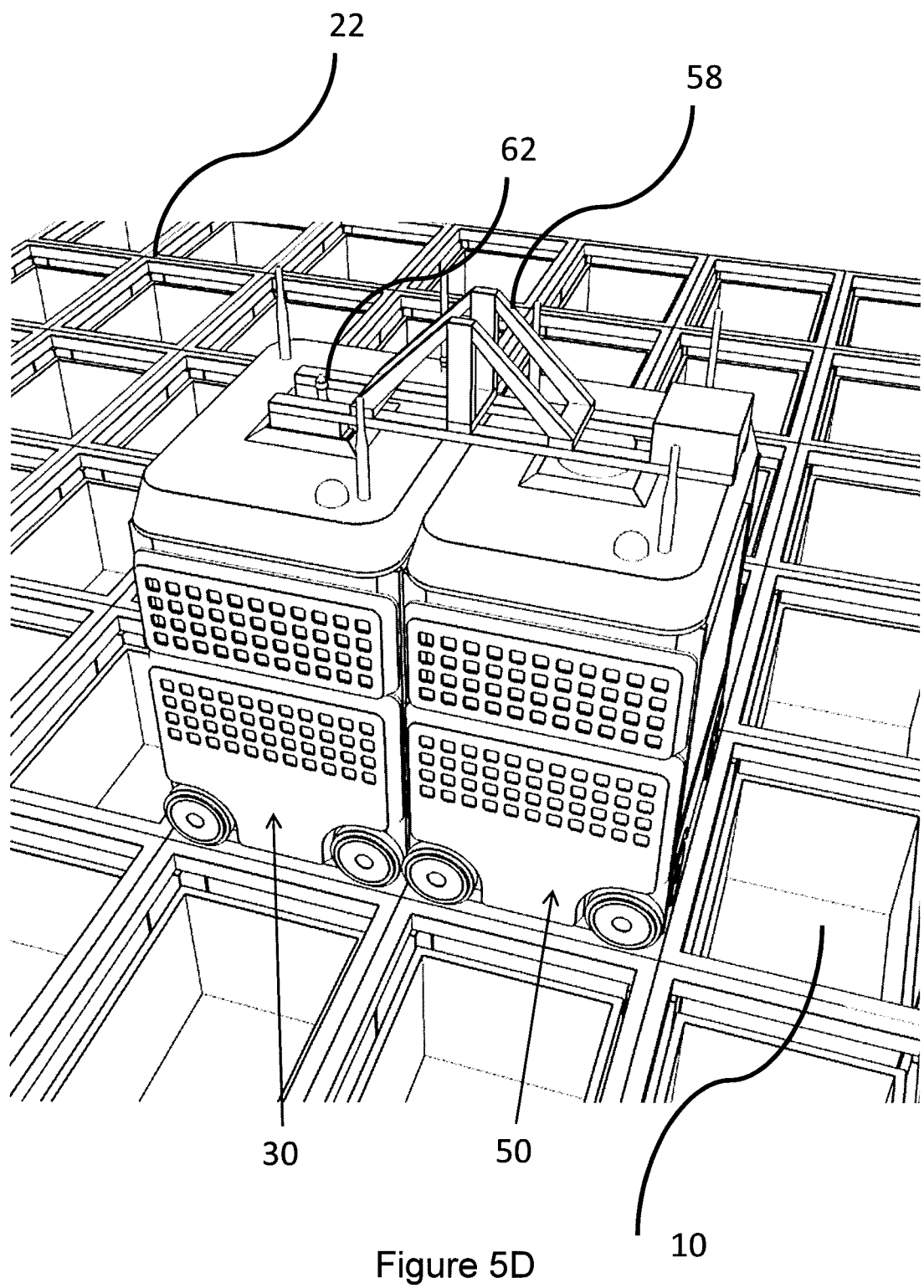
Figure 5E:
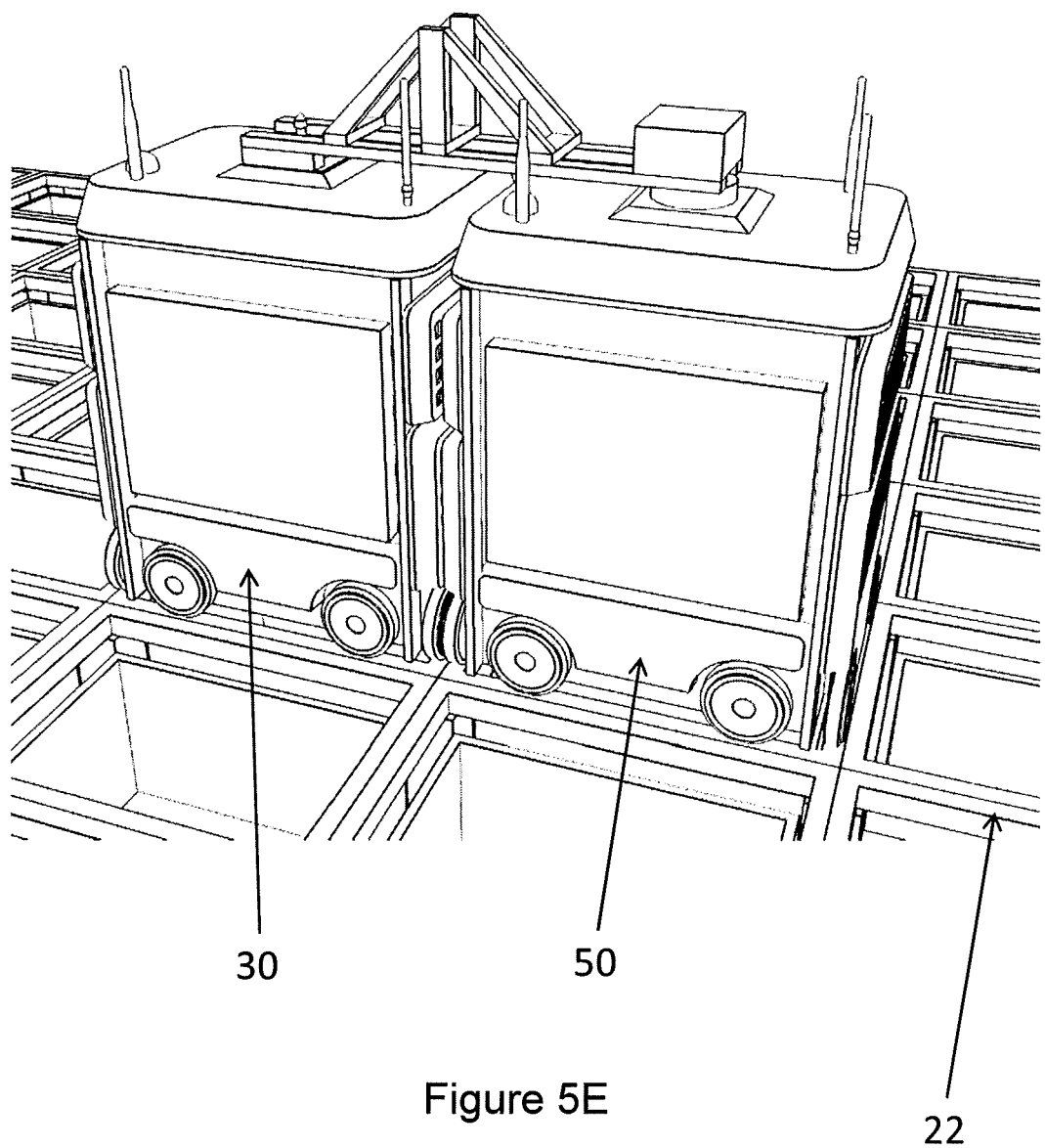

FIGS. 5A and 5B are schematic perspective views of a robotic service device according to one embodiment of the present invention, the robotic service device being electrically connectable to a load handling device to facilitate charging or electrical restarting of the load handling device; and FIGS. 5C, 5D and 5E are schematic perspective views of a robotic service device according to one embodiment of the present invention, the robotic service device being on the storage system of FIG. 4, in FIG. 5C the robotic service device being positioned adjacent one load handling device of the type shown in FIG. 3A, and in FIGS. 5D and 5E the robotic service device being deployed in to position to re-start the load handling device.

Figure 1:
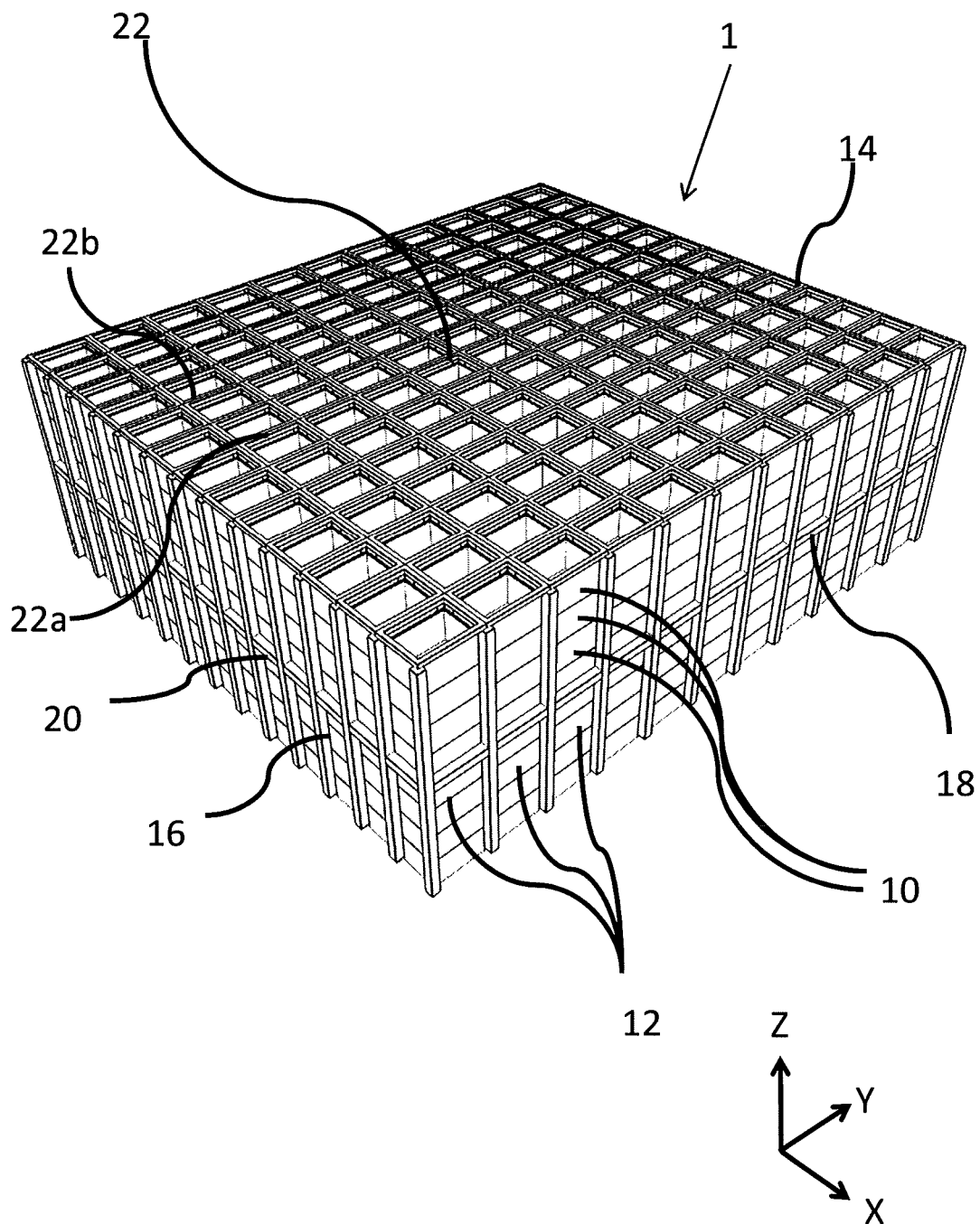
FIG. 1 is a schematic perspective view of a frame structure for housing a plurality of stacks of bins in a known storage system.
Figure 2:
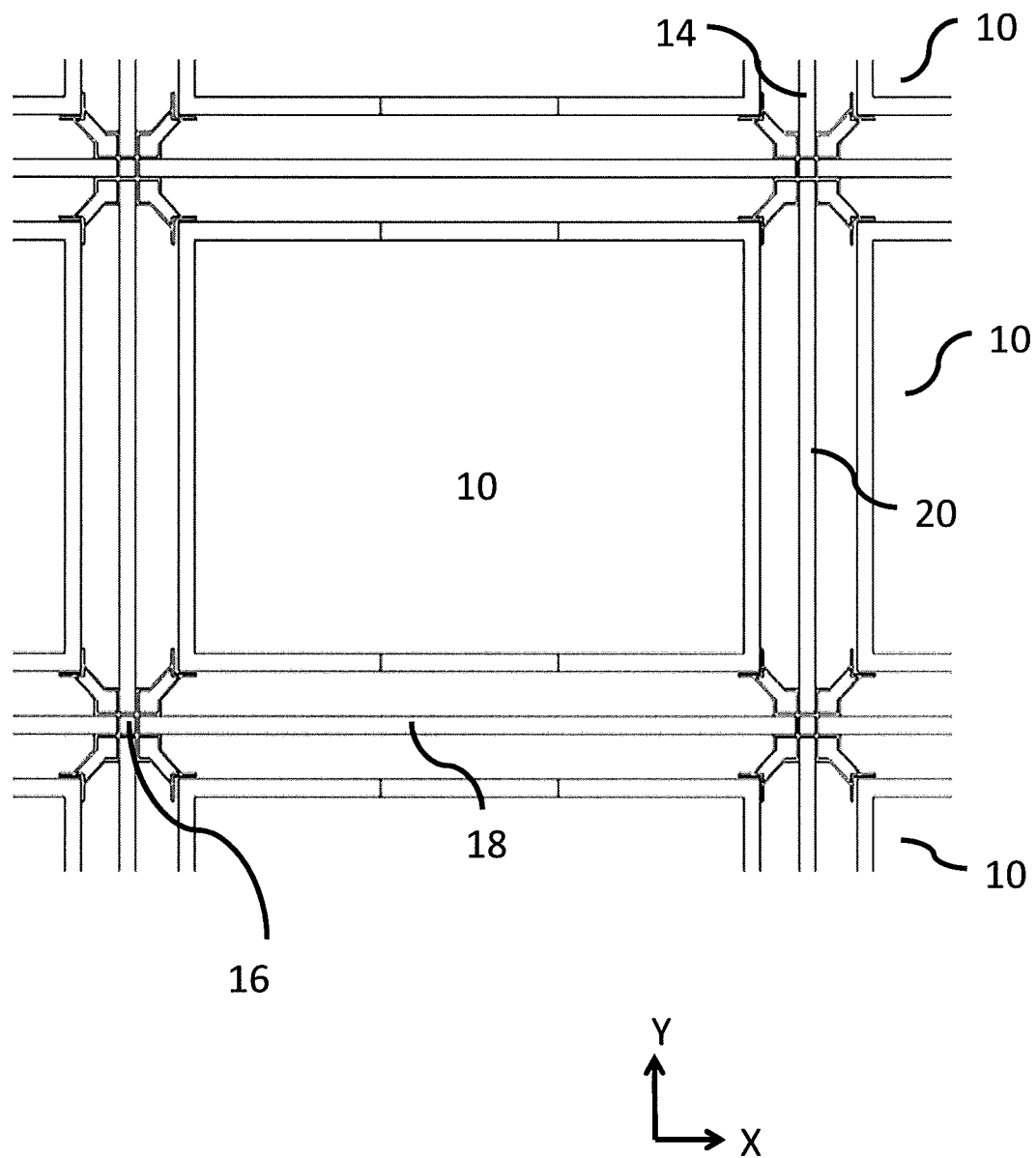
FIG. 2 is a schematic plan view of part of the frame structure of FIG. 1.

As shown in FIGS. 1 and 2, stackable containers, known as bins 10, are stacked on top of one another to form stacks 12. The stacks 12 are arranged in a grid frame structure 14 in a warehousing or manufacturing environment. FIG. 1 is a schematic perspective view of the frame structure 14, and FIG. 2 is a top-down view showing a single stack 12 of bins 10 arranged within the frame structure 14. Each bin 10 typically holds a plurality of product items (not shown), and the product items within a bin 10 may be identical, or may be of different product types depending on the application.

The frame structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the frame structure 14, so that the frame structure 14 guards against horizontal movement of the stacks 12 of bins 10, and guides vertical movement of the bins 10.

Figures 3B, 3C:
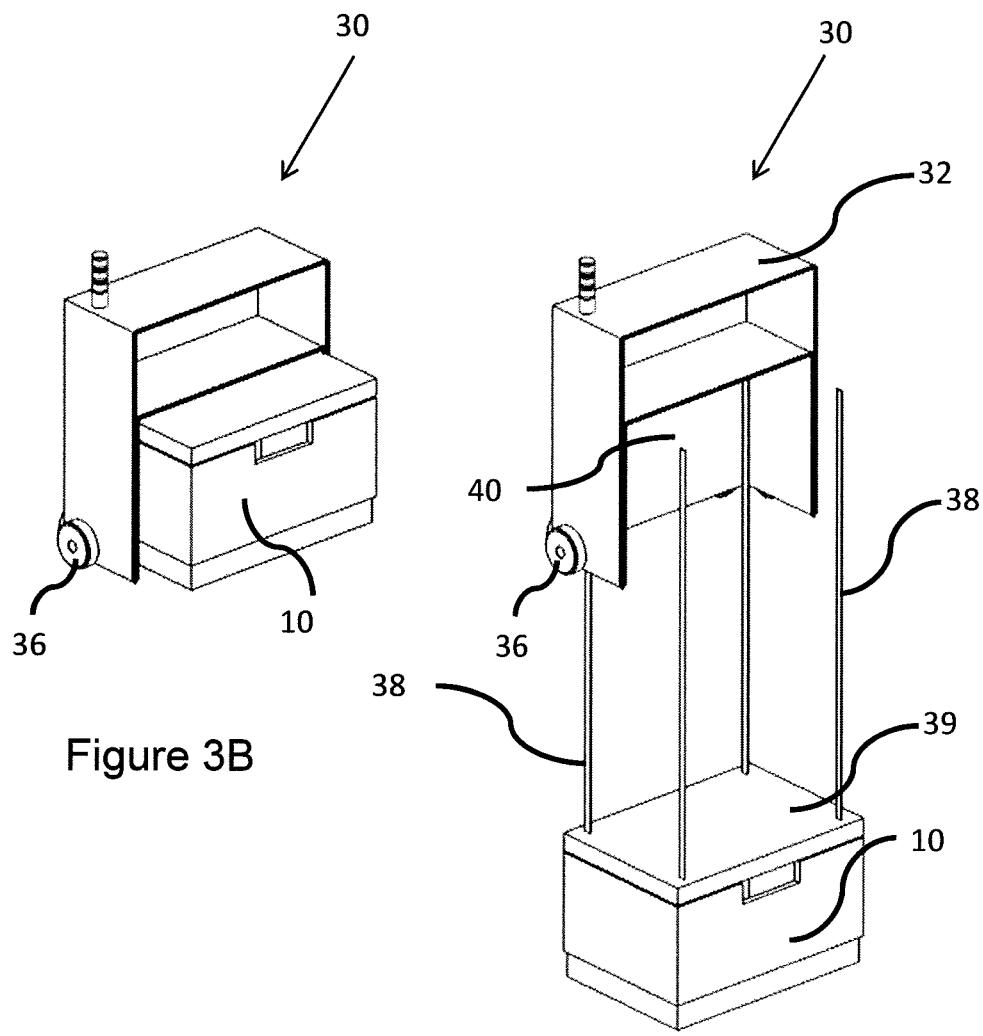
FIG. 3C is a schematic perspective view of the known load handler device in use lifting a bin.

The top level of the frame structure 14 includes rails 22 arranged in a grid pattern across the top of the stacks 12. Referring additionally to FIGS. 3 and 4, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 in two dimensions in the X-Y plane, so that a load handling device 30 can be moved into position above any of the stacks 12.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, are arranged to engage with two adjacent rails of the first set 22a of rails 22. Similarly, a second set of wheels 36, consisting of a pair of wheels 36 on each side of the vehicle 32, are arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 are lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 are lifted clear of the rails 22, and the second set of wheels 36 are lowered into engagement with the second set of rails 22a. The drive mechanism can then be used to drive the second set of wheels 36 to achieve movement in the Y direction.

In this way, one or more robotic load handling devices 30 can move around the top surface of the stacks 12 on the frame structure 14 under the control of a central picking system (not shown). Each robotic load handling device 30 is provided with means for lifting out one or more bins or containers from the stack to access the required products. In this way, multiple products can be accessed from multiple locations in the grid and stacks at any one time.

FIG. 4 shows a typical storage system as described above, the system having a plurality of load handling devices 30 active on the stacks 12. In addition, a robotic service device 50 is positioned on the grid 14.

It will be appreciated that any form of load handling device 30 may be in use and that the robotic service device may be suitably adapted to interact with any such load handling device 30.

A first form of robotic service device 50 in accordance with the invention, will now be described with reference to FIG. 5.

Referring to FIGS. 5A, 5B, 5C, 5D and 5E, the robotic service device 50 comprises a vehicle 52 having first and second sets of wheels 54, 56 that are engageable with the first and second sets 22a, 22b of rails 22, respectively.

In a similar manner to the operation of the load handling device 30, the first and second sets of wheels 54, 56 of the robotic service device 50 can be moved vertically with respect to the vehicle 50 to engage or disengage the wheels from the corresponding set of rails 22a, 22b of the storage system. By engaging and driving the appropriate set of wheels 54, 56 the robotic service device 50 can be moved in the X and Y directions in the horizontal plane on the top of the frame structure 14.

In the event of a failure or malfunction of a robotic load handling device 30, the robotic service device 50 is moved on the grid 14 to a location adjacent the malfunctioning device 30. Once adjacent to the malfunctioning device 30, camera means (not shown) of the service device 50 may be used to view the situation from a control position (not shown).

The robotic service device 50 is provided with means 58 for releasably electrically connecting to a malfunctioning robotic load handling device 30. The releasable electrical connection means may comprise a sliding mechanism as shown in FIGS. 5A, 5B and 5C. In the embodiment shown in these Figures, the electrical connection means 58 comprises sliding means 60 deployable from the robotic service device 50. The electrical connection means 58 is shaped so as to conform to the charging means 62 or powering means or battery means 64 of the robotic load handling device 30 such that when the electrical connection means 58 is in electrical contact with the charging 62 or power means or battery means 64 of the load handling device 30, the load handling device 30 may be jump started from the robotic service device.

It will be appreciated that the electrical charging means 58 need not be of the form described above, or shown in FIG. 5A, 5B or 5C but may take any suitable form adapted to electrically connect with a corresponding charging or jump start point on the associated robotic service device 50. This may include magnetic connection means, interference connection means, wireless connection means or any other form of electrical connection means. Furthermore, the connection means 58 need not be deployable by a sliding mechanism, but may take any suitable form capable of deployment from the service device 50 and capable of electrical connection to the load handling device 30.

It will further be appreciated that the connection between the robotic load handling device and the robotic service device must be adapted so as to be releasable once sufficient power has been transmitted between the devices.

Furthermore, the releasable connection may be made and broken under the command of a utility within control software of the picking system.

It will further be appreciated that the robotic service device need not comprise a load carrying portion or cavity for transporting containers 10 as the load handling device may require. Instead, the load carrying portion or cavity region may comprise additional cell or battery means (not shown) to enable the service device to provide sufficient power to the load handling device to enable the load handling device 30 to operate for sufficient time to return to a maintenance or charging area of the storage system.

If, a load handling device 30 has experienced a loss of power as a result of a discharged battery or for any other reason, a releasable electrical connection is made between the load handling device 30 and the robotic service device 50.

Once connected together, the robotic service device 50 supplies power to the load handling device 30. The power recharges or jump starts the disabled load handling device's 30 battery and/or provides some or all of the power needed to start the drive mechanism (not shown) of the load handling device 30.

Once the load handling device 30 has been re-started, the electrical connection means 58 of the robotic service device 50 to the load handling device 30 is released. The load handling device's normal battery charging system or regime resumes and the normal operation of the load handling device 30 will restore the charge of the battery of the load handling device 30.

If the load handling device 30 cannot be restarted by the robotic service device 50 or it requires removal from the grid 14, then the service device 50 may be releasably latched to the malfunctioning load handling device 30 to enable the service device 50 to manipulate the malfunctioning device 30 to a location where it can be serviced or removed entirely from the grid 14.

Optionally the robotic service device 50 may be provided with a releasable latching mechanism and camera means (not shown). Furthermore, the device 50 may be provided with cleaning means such as brush mechanisms and a vacuum cleaning system mounted adjacent each set of wheels. The robotic service device 50 may also include a spray device capable of discharging suitable detergent under the control of the central picking system (not shown).

It will be appreciated that any suitable form of releasable latching mechanism may be used to enable the robotic load handling device to be releasably attached to the robotic service device. Furthermore, it will be appreciated that the releasable latching mechanism may also comprise the electrical charging means 58. The releasable latching mechanism may connect to a faulty robotic load handler and either lift it clear off the grid, or be able to raise and lower the sets of wheels on the faulty device, so as to be able to push, pull or drag it to a desired location. The latching mechanism may also include a device for causing the faulty load handling device's gripper mechanism 39 to be retracted from the within the framework or make any other mechanical or electrical intervention required by the robotic load handler 30.

Furthermore, it will be appreciated that the service device 50 may be provided with sensor means instead of or in addition to camera means. For example, the service device 50 may be provided with sensors that allow a system operator to remotely diagnose a fault with a malfunctioning or stationary robotic load handler 30. This may include, but not be limited to, further electrical connection means to connect to a port of the robotic load handler 30 to check for or diagnose faults via an installed diagnostic system. This may further include sensors such as ultrasonic detectors, x-ray cameras, or sensors for assessing the telecommunications functions within the load handling device 30. It will be appreciated that this further connection means may also be integrated with the electrical connection means 58.

Moreover, the service device 50 may comprise reset means, in addition to or instead of the sensors discussed above, to enable the service device 50 to reset the robotic load handling device 30. The reset means may comprise mechanical means such as a remotely operated manipulator device or it may comprise remotely operable electrical reset means. The mechanical manipulator may further be remotely operable to push the load handling device 30 should the diagnosis suggest the load handling device 30 is simply temporarily stuck on a portion of the grid. Alternatively, the mechanical device may act in conjunction with the service device 50 to push the load handling device to an alternative portion of the grid or off the grid completely.

In this manner, the integrity of a large robotically controlled picking system can be maintained and cleaned without the requirement of stopping the whole system to retrieve malfunctioning load handling devices 30 or to clean spillages on the grid. In systems of significant size this can represent a substantial decrease in the down time of the system.

Furthermore, it is possible for the robotic service device described in all or any of the embodiments above to be adapted to carry equipment such as barriers (not shown). The remotely operable mechanical manipulating means may position barriers around a portion of the grid for example, for safety reasons should an operator need to be present on the grid.

It will be appreciated that robotic service devices as described above may contain one or all of the features described. For example, a service device may be capable of: making a releasable electrical connection with the load handling device 30 to supply power to restart the load handling device, and lifting a malfunctioning load handling device off the grid and removing it to a maintenance location on the grid, whilst also comprising traction monitoring means and cleaning devices. Furthermore, a ride-on service device may also be provided with the means to pull a malfunctioning load handling device off the grid.

Furthermore, the robotic service device 50 may comprise a load carrying portion, similar to the load handling device, the load carrying portion being adapted to carry maintenance and cleaning equipment such as that described above. Moreover, the load carrying portion may be interchangeable such that one service device may be able to perform different functions depending on the load carrying portion provided at any one time.

It will also be appreciated that the robotic load handling devices 30 may be of a cantilever form shown that occupy two grid spacings or alternatively the robotic load handling devices 30 may be of the form shown in the Figures where they occupy only a single grid spacing.

Moreover, it will be appreciated that the service device described in accordance with the invention, may take any suitable form or configuration. For example, the service device may be of a bridge design to be disposed over the malfunctioning device, or may take the form of a u-shaped device that encompasses the malfunctioning device. The requirement of the present invention is that the service device is electrically connectable to the malfunctioning device such that the service device may jump start or charge the malfunctioning device in the event of power failure.

It will be appreciated that whilst the embodiment of the invention above is described with reference to the service device operating to jump start a malfunctioning bot, the service device may additionally be provided with other facilities or equipment such as cleaning equipment such as brushes and the like, monitoring equipment such as cameras or sensor systems and the like, visual monitoring equipment such as cameras and the like.

The invention claimed is:

1. A storage and robotic picking system having two substantially perpendicular sets of rails forming a grid and the system comprising:
    a plurality of robotic load handling devices operative on the rails; and
    a service device,
    the plurality of robotic load handling devices and the service device each comprising:
        a body mounted on two sets of wheels, the first set of wheels being arranged to engage with at least two rails of the first set of rails, the second set of wheels being arranged to engage with at least two rails of the second set of rails, the first set of wheels being independently moveable and driveable with respect to the second set of wheels such that only one set of wheels will engage with the rails at any one time thereby enabling movement of the plurality of robotic load handling devices and the service device along the rails to any point on the grid by driving only the set of wheels engaged with the rails, wherein the service device further comprises:
deployable, releasable electrical connecting means, said deployable, releasable connecting means when deployed acting to connect the service device to one of the plurality of robotic load handling devices; and
a power source connected to said deployable, releasable connecting means such that when said connecting means is connected to one of the plurality of robotic load handling devices the power source of the service devices supplies for power to one of the plurality of robotic load handling devices via the electrical connecting means.

2. A storage system according to claim 1, wherein one of the plurality of robotic load handling devices when electrically connected to the power source of the service device by the deployable, releasable connecting means provides a power source for the one robotic load handling device such that a battery in a robotic load handling device.

3. A storage system according to claim 2, wherein the power source of the service device is configured to drive a drive mechanism in one of the plurality of robotic-load handling devices.

4. A storage system according claim 3, wherein the service device further comprises:
a cleaning mechanism having means for removing contaminants when present on a grid system.

5. A storage system according to claim 4, wherein the service device further comprises:
a releasable latching mechanism, the latching mechanism being configured to releasably dock the service device to any load handling device when present on a grid, the latching mechanism additionally being configured to isolate one of the plurality of load handling devices from the grid such that the service device will assume control of the one load handling device and move the one load handling device to a predetermined position on the grid when under control of the a picking system.

6. A storage system according claim 5, wherein the latching mechanism comprises:
means for releasably docking the service device to a load handling device, and wherein the service device further comprises:
means for releasing both sets of wheels from rails of a picking system such that the service device can push or pull a load handling device to a predetermined position on the grid.

7. A storage system according claim 6, wherein the service device further comprises:
a traction measurement system, the traction measurement system having drive means for driving one set of wheels engaged with a grid whilst stopping engagement of a different set of wheels with the grid, said driving means being controlled by suitable electronic control means.

8. A device storage system according to claim 7, wherein the service device further comprises:
camera means for providing a vision system for a user to remotely observe a condition of robotic load handlers or a grid.

9. A storage system according to claim 8, wherein the service device further comprises:
seating means configured for a user to manually intervene on a grid.

10. A storage system according to claim 1, wherein the power source of the service device when connected to one of the plurality of load handling devices via the deployable, releasable connecting means is configured to drive a drive mechanism in a robotic-load handling device.

11. A storage system according to claim 1, comprising:
a cleaning mechanism having means for removing contaminants when present on a grid system.

12. A storage system according to claim 1, wherein the service device further comprises:
a releasable latching mechanism, the latching mechanism being configured to releasably dock the service device to any load handling device when present on a grid, the latching mechanism additionally being configured to isolate a load handling device from the grid such that the service device will assume control of the load handling device and move the load handling device to a predetermined position on the grid when under control of the a picking system.

13. A storage system according claim 12, in which the latching mechanism of the service device comprises:
means for lifting a load handling device clear of rails, and for removing that load handling device to a predetermined position on a grid.

14. A storage system according claim 12, in which the latching mechanism of the service device comprises:
means for releasably docking the service device to a load handling device, the service device comprising:
means for releasing both sets of wheels from rails of a picking system such that the service device can push or pull a load handling device to a predetermined position on the grid.

15. A storage system according claim 1, wherein the service device further comprises:
a traction measurement system, the traction measurement system having drive means for driving one set of wheels engaged with a grid whilst stopping engagement of a different set of wheels with the grid, said driving means being controlled by suitable electronic control means.

16. A storage system according to claim 15, in which the electronic control means comprises:
means for monitoring rotation of all sets of wheels to measure traction of the wheels on the grid, and for comparing a measured traction with a predetermined traction data in order to establish when grid cleaning is required.

17. A storage system according claim 16, wherein the service device further comprises:
a vacuum cleaner and/or several brushes and/or a spray device to deal with spillages on a grid.

18. A storage system according to claim 1, wherein the service device further comprises:
camera means for providing a vision system for a user to remotely observe a condition of robotic load handlers or a grid.

19. A storage system according to claim 1, wherein the service device further comprises:
seating means configured for a user to manually intervene on a grid.

20. A storage system according to claim 1, wherein the deployable connecting means of the service device comprises a sliding mechanism slidably deployable from the service device and configured to electrically connect to one of the one or more load handling devices.

21. A method for operating a storage system having a plurality of load handling devices and a service device, the plurality of load handling devices and the service device operative on a grid of a robot picking system, the grid having two substantially perpendicular sets of rails forming and having the plurality of robotic load handling devices and the service device thereon, each robotic load handling device and the service device having:

a body mounted on two sets of wheels, the first set of wheels being arranged to engage with at least two rails of the first set of rails, the second set of wheels being arranged to engage with at least two rails of the second set of rails, the first set of wheels being independently moveable and driveable with respect to the second set of wheels such that only one set of wheels will engage with the grid at any one time thereby enabling movement of the service device along the rails to any point on the grid by driving only the set of wheels engaged with the rails; deployable, releasable electrical connecting means, said deployable, releasable connecting means when deployed acting to connect the service device to one of the plurality of robotic load handling devices; and a power source connected to said deployable, releasable connecting means such that when said connecting means is connected to one of the plurality of robotic load handling devices the power source of the service devices supplies power to one of the plurality of robotic load handling devices via the electrical connecting means, the method comprising:

i) deploying deployable electrical connecting means from the service device;
ii) connecting the service device to one of the plurality of load handling devices using the deployable electrical connecting means;
iii) supplying power from the service device to one of the plurality of load handling devices via the deployable releasable electrical connecting means to restart or charge the load handling device;
iv) disconnecting the service device.

* * * * *